United States Patent
Kushnir

(10) Patent No.: US 9,571,976 B1
(45) Date of Patent: Feb. 14, 2017

(54) OPTIMIZED RADIO FREQUENCY SIGNAL STRENGTH SAMPLING OF A BROADCAST AREA FOR DEVICE LOCALIZATION

(71) Applicant: Alcatel-Lucent USA Inc., Murray Hill, NJ (US)

(72) Inventor: Dan Kushnir, Springfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/973,502

(22) Filed: Dec. 17, 2015

(51) Int. Cl.
*H04W 4/02* (2009.01)
*G01S 5/02* (2010.01)
*H04B 17/318* (2015.01)

(52) U.S. Cl.
CPC ............ *H04W 4/023* (2013.01); *G01S 5/0252* (2013.01); *H04B 17/318* (2015.01)

(58) Field of Classification Search
CPC ...... G01S 5/0252; G01S 5/0263; G01S 11/06; G01S 5/0278; H04W 64/00; H04W 4/04; H04W 4/021; G01C 21/206
See application file for complete search history.

(56) References Cited

U.S. PATENT DOCUMENTS

2011/0207474 A1* 8/2011 Hazzani ................. G01S 5/021
455/456.1
2015/0341895 A1* 11/2015 Zhang ..................... G01S 5/021
455/456.1

* cited by examiner

*Primary Examiner* — Nam Huynh
(74) *Attorney, Agent, or Firm* — Duft Bornsen & Fettig, LLP

(57) ABSTRACT

Embodiments described herein provide improvements to the accuracy of location estimates. In one embodiment, an apparatus stores a first plurality of RF signal strength values that are mapped to known locations, and stores a second plurality of RF signal strength values that are not mapped to known locations. The apparatus estimates locations where the second plurality of RF signal strength values was measured based on the first plurality of RF signal strength values and their corresponding known locations, calculates an uncertainty for the estimated locations, and identifies an estimated location having a highest uncertainty. The apparatus directs a measurement device to measure an RF signal strength value at a known location that corresponds with the estimated location, and adds the RF signal strength value to the first plurality of RF signal strength values to reduce an uncertainty in subsequent estimates of locations within the broadcast area.

18 Claims, 7 Drawing Sheets

OPTIMIZED RADIO FREQUENCY SIGNAL STRENGTH SAMPLING OF A BROADCAST AREA FOR DEVICE LOCALIZATION

FIELD OF THE INVENTION

The invention is related to the field of Radio Frequency (RF) based location estimates that utilize RF signal strength measurements.

BACKGROUND

RF signal strength measurements can be used to estimate a location of an RF receiving device within a broadcast area. The location of the RF receiving device may then be used to provide a number of services to a user of the device, including navigation, location-based advertisements, etc.

Many methods of RF localization rely on constructing a database of RF signal strength measurements for which the positions within a RF broadcast area are known, and estimating a location of a device using RF signal strength measurements provided by the device and the information in the database. For instance, estimating a location of the device within the broadcast area may be performed by interpolating the known locations in the database with the newly acquired RF signal strength measurements.

In practice, providing an accurate estimate of location may require a database having a large number of RF signal strength samples that are correlated with known locations, and/or may require re-sampling of a broadcast area to account for changes within the broadcast area. For instance, if the broadcast area is within a store, changes to the interior of the store can degrade the accuracy of location estimates that utilize an out-of-date database. In addition, the desire to provide a more accurate estimate of location of devices in a broadcast area may require an exceedingly large number of samples for the database, which can be time consuming to collect. Thus, there is a need to improve location estimates within an RF broadcast area that do not rely upon creating and/or maintaining a database of a large number of RF signal strength samples and their correlated known locations.

SUMMARY

Embodiments described herein identify locations within a broadcast area where RF signal strength sampling would improve the accuracy of data used to estimate locations within the broadcast area. Where to perform the RF signal strength measurements are determined based on the uncertainty of the estimated locations within the broadcast area. The uncertainty is calculated, and an estimated location having the highest uncertainty is identified. A measurement device is directed to sample the RF signal strength at a known location within the broadcast area that corresponds with the estimated location. This RF signal strength sample along with its correlation with a known location can be used in subsequent estimates of locations within the broadcast area to improve the accuracy of the estimates.

In one embodiment, an apparatus includes a memory and electronic circuitry communicatively coupled to the memory. The memory is configured to store a first plurality of RF signal strength values that are mapped to known locations within a broadcast area served by a plurality of RF transmitters, and to store a second plurality of RF signal strength values that are not mapped to known locations within the broadcast area. The electronic circuitry is configured to estimate locations within the broadcast area where the second plurality of RF signal strength values were measured based on the first plurality of RF signal strength values and their corresponding known locations. The electronic circuitry is further configured to calculate an uncertainty for the estimated locations, and to identify an estimated location having a highest uncertainty. The electronic circuitry is further configured to direct a measurement device to measure an RF signal strength value at a known location within the broadcast area that corresponds with the estimated location, and to add the RF signal strength value to the first plurality of RF signal strength values to reduce an uncertainty in subsequent estimates of locations within the broadcast area where RF signal strength values were measured.

In an embodiment, the electronic circuitry is configured to iteratively perform the following to further reduce the uncertainty in subsequent estimates of locations within the broadcast area where RF signal strength values were measured: re-estimate the locations based on additions to the first plurality of RF signal strength values and their corresponding known locations, calculate an uncertainty for the re-estimated locations, identify a re-estimated location having the highest uncertainty, direct the measurement device to measure another RF signal strength value at a known location within the broadcast area that corresponds with the re-estimated location, and add the other RF signal strength value to the first plurality of RF signal strength values.

In an embodiment, the RF signal strength values comprise Receive Signal Strength Indicator (RSSI) values.

In an embodiment, the electronic circuitry is configured to identify one of the estimated locations, to identify a plurality of the known locations within the broadcast area that are proximate to the one of the estimated locations, to and to calculate the uncertainty for the one of the estimated locations based on a distribution of the known locations that are proximate.

In an embodiment, the electronic circuitry is configured to calculate the uncertainty based on a standard deviation of the distribution.

In an embodiment, the electronic circuitry is configured to calculate the uncertainty based on an entropy of the distribution.

Another embodiment comprises a method performed in a broadcast area served by a plurality of Radio Frequency (RF) transmitters. The method comprises identifying a first plurality of RF signal strength values that are mapped to known locations within the broadcast area, and identifying a second plurality of RF signal strength values that are not mapped to known locations within the broadcast area. The method further comprises estimating locations within the broadcast area where the second plurality of RF signal strength values were measured based on the first plurality of RF signal strength values and their corresponding known locations, and calculating an uncertainty for the estimated locations. The method further comprises identifying an estimated location having a highest uncertainty, and directing a measurement device to measure an RF signal strength value at a known location within the broadcast area that corresponds with the estimated location. The method further comprises adding the RF signal strength value to the first plurality of RF signal strength values to reduce an uncertainty in subsequent estimates of locations within the broadcast area where RF signal strength values were measured.

Another embodiment comprises a non-transitory computer readable medium embodying programmed instructions which, when executed by a processor, direct the processor to identify a first plurality of Radio Frequency (RF) signal strength values that are mapped to known locations within a broadcast area served by a plurality of RF transmitters, to identify a second plurality of RF signal strength values that are not mapped to known locations within the broadcast area, and to estimate locations within the broadcast area where the second plurality of RF signal strength values were measured based on the first plurality of RF signal strength values and their corresponding known locations. The instructions further direct the processor to calculate an uncertainty for the estimated locations, to identify an estimated location having a highest uncertainty, and to direct a measurement device to measure of an RF signal strength value at a known location within the broadcast area that corresponds with the estimated location. The instructions further direct the processor to add the RF signal strength value to the first plurality of RF signal strength values to reduce an uncertainty in subsequent estimates of locations within the broadcast area where RF signal strength values were measured.

Other example embodiments may be described below.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific example embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
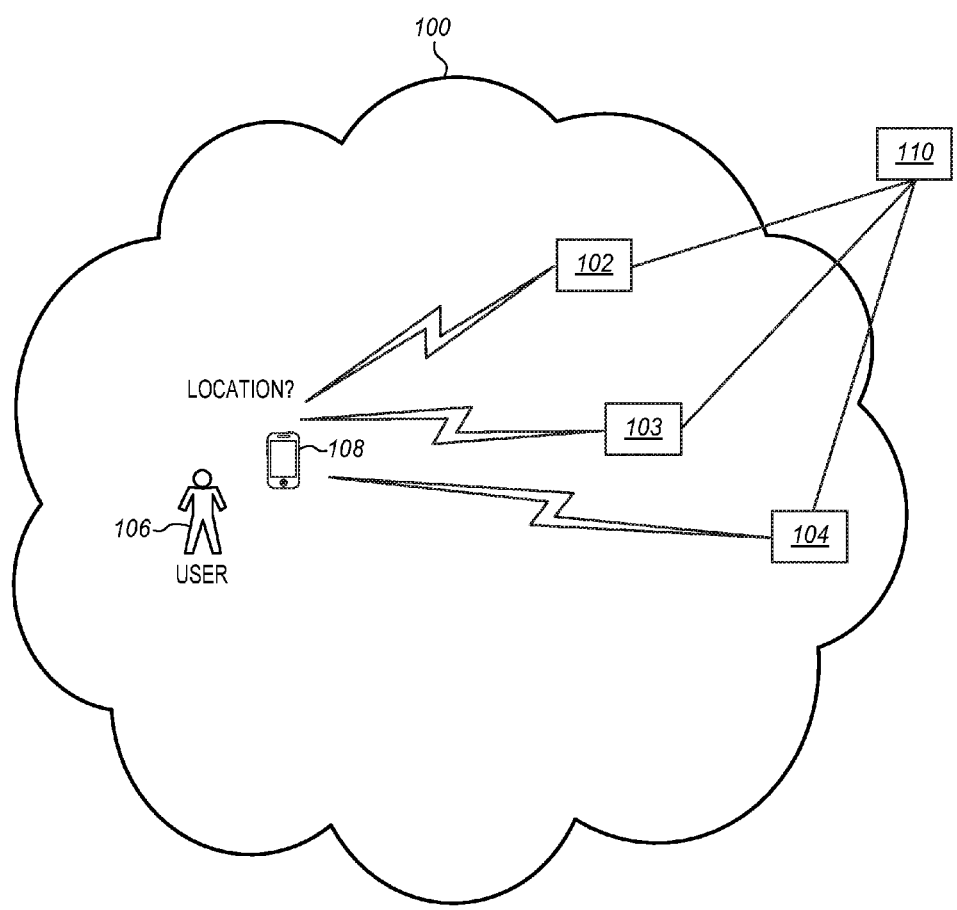
FIG. 1 illustrates a wireless broadcast area served by a plurality of wireless transmitters in an example embodiment.

FIG. 1 illustrates a wireless broadcast area 100 served by a plurality of wireless transmitters 102-104 in an example embodiment. For example, broadcast area 100 may serve a department store, supporting a desire to provide location-aware services to a user 106 via a mobile device 108. Some examples of a location-aware service that may be provided to user 106 include location-based advertisements, etc. Using location-based advertisements, a department store may provide different advertisements to user 106 depending on where user 106/mobile device 108 is located within the department store. For instance, if user 106 is proximate to an electronics section of the department store, then mobile device 108 may be provided with advertisements, coupons, department store specials, etcetera, regarding electronic items for sale within the electronics section of the department store. In like manner, if user 106 is proximate to a men's clothing section of the department store, then mobile device 108 maybe provided with advertisements, coupons, department store specials, etcetera, regarding men's clothing items for sale with the men's clothing section of the department store.

One mechanism to provide location-aware services to user 106 uses RF measurements captured by mobile device 108, which are provided to a location estimator 110. In this mechanism, mobile device 108 measures the RF signal strength values from one or more of wireless transmitters 102-104, and provides those measurements to location estimator 110. As mobile device 108 moves relative to wireless transmitters 102-104, the RF signal strength received from each of wireless transmitters 102-104 changes. Generally, the RF signal strength increases as mobile device 108 is carried closer to a wireless transmitter, and the RF signal strength decreases as mobile device 108 is carried away from a wireless transmitter. However, since RF propagation in an environment is not a simple linear relationship, correlating the location of mobile device 108 within broadcast area 100 typically relies upon sampling the RF signal strength values at various locations within broadcast area 100. This is used by location estimator 110 to calculate or estimate the location of mobile device 108, and consequentially, the location of user 106 as well.

Figure 2:
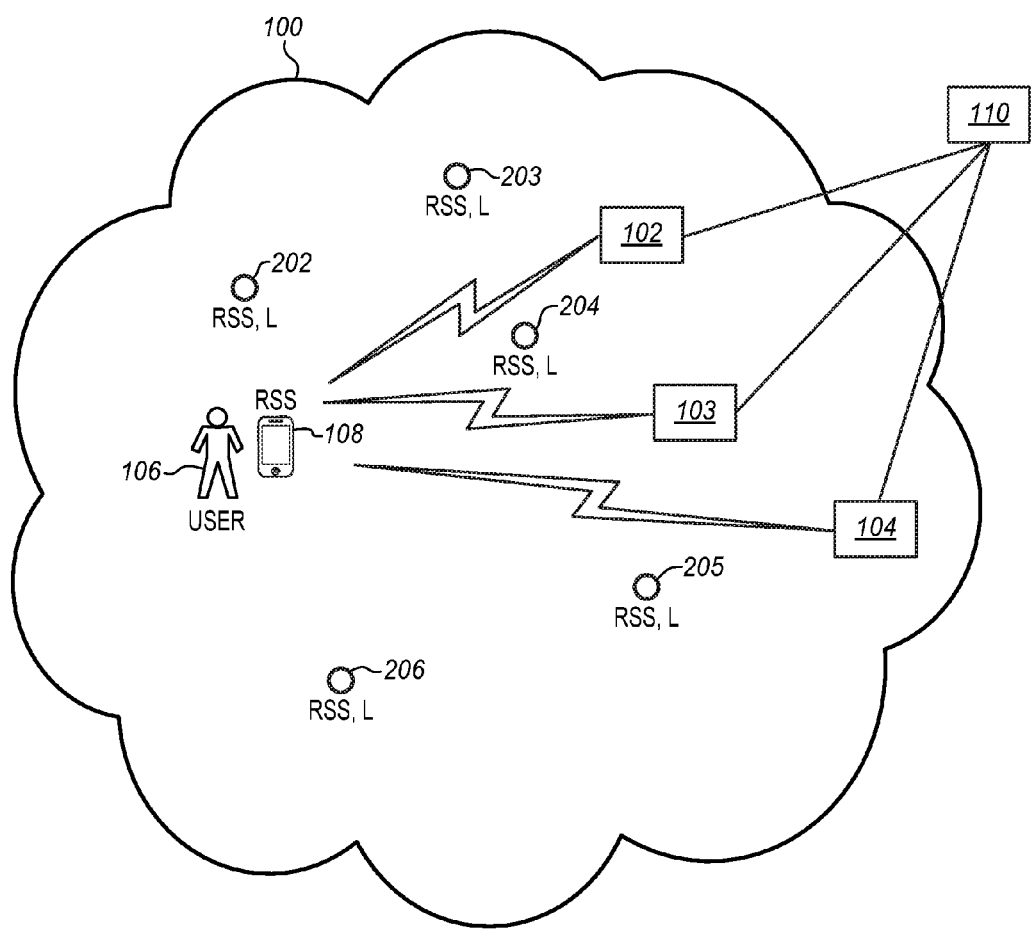
FIG. 2 illustrates a wireless broadcast area where samples of RF signal strength values have been captured at various locations in an exemplary embodiment.

FIG. 2 illustrates a wireless broadcast area where samples 202-206 of RF signal strength values have been captured at various locations in an exemplary embodiment. In FIG. 2, a number of circular elements are shown within broadcast area 100, representing locations within broadcast area 100 where RF sampling has been performed. To sample the RF environment, an RF receiver may be taken to various physical locations within broadcast area 100. RF samples are then captured that represent the RF signal strength values for one or more of wireless transmitters 102-104. At the various locations, the location of the sample is recorded as well. The combination of Received Signal Strength (RSS) values and location information for the samples are recorded for use by location estimator 110 when attempting to locate mobile device 108 within broadcast area 100. During operation, mobile device 108 measures RSS value(s) and provides the RSS value(s) to location estimator 110. Location estimator 110 uses the RSS value(s) provided by mobile device 108 to estimate a location of mobile device 108 within broadcast area 100. For instance, location estimator 110 may interpolate or perform a regression process between the RSS value(s) measured by mobile device 108 and the samples 202-206. Since the samples 202-206 represent known locations within broadcast area 100, location estimator 100 is able to provide an estimated location of mobile device 108 within broadcast area 100.

As mobile device 108 is carried closer to sample 206 and farther away from sample 202, it would be expected that the RSS value(s) measured by mobile device 108 would more closely represent the RSS value(s) recorded in sample 206. It would also be expected that the RSS values(s) measured by mobile device 108 would less closely represent the RSS value(s) recorded in sample 202. This type of correlation is used by location estimator 110 to estimate a location of mobile device 108.

Since a plurality of wireless transmitters 102-104 are present within broadcast area, the particular RSS values captured at samples 202-206 may be a snapshot of more than one RSS value at a location. Instead, samples 202-206 may include a number of RSS values, each of the RSS values corresponding with a unique wireless transmitter 102-104.

One problem associated with this type of estimating activity is that a large number of RSS values are needed to provide a reasonable accuracy in the estimated location for a mobile device. Often, a large number of RSS value—location samples are obtained for a particular area, with the granularity between the different locations of the samples being a factor in how accurately location estimator 110 can be regarding the location of mobile device 108. For instance, with only a few samples 202-206, the accuracy may be quite low. However, capturing a large number of samples 202-206 is time consuming, and may need to be repeated for the same area when the RF conditions change.

Since the RF propagation properties of an area are subject to the materials and the configuration of the materials within the space, changing the configuration and/or the materials in the space can change the RSS values within the space. This is particularly true for indoor locations such as a department store, which are often reconfigured with different items for sale, different displays, and/or different locations for the displays that are present within the interior space of the department store.

This type of reconfiguration of the space typically requires that a new RF survey be performed. In order to generate a new set of RSS values at known locations within broadcast area 100. Further, it is often difficult to know in advance how many and how closely together in location the samples should be taken, in order to provide a reasonable amount of error in the estimates for locations that are performed. Since the RF environment may be unpredictable and is most certainly non-linear in nature, it may be necessary to sample some portions of broadcast area 100 more often than other portions of broadcast area 100. Still, this type of information is often unavailable without complex RF modeling that is beyond the capabilities of the user of this type of RF location estimating system. Therefore, there is a desire to improve the accuracy of systems that estimate locations of mobile devices within an RF environment, and in addition, to reduce the sampling burden of the RF environment that typically follows a desire for accuracy in the estimates.

Figure 3:
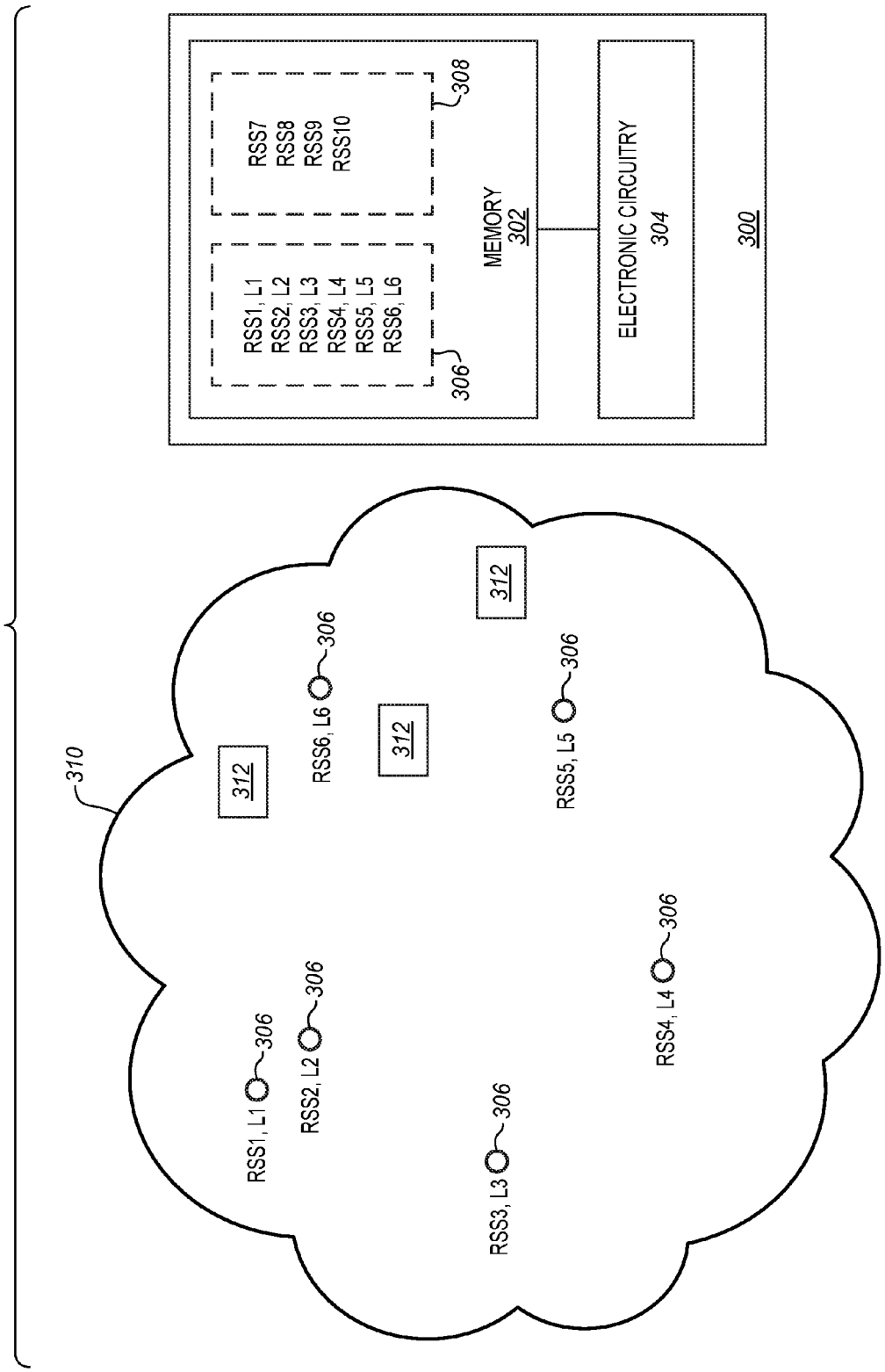
FIG. 3 is a block diagram of an apparatus that identifies where RF signal strength sampling within a broadcast area would improve the accuracy of estimates of locations in an exemplary embodiment.

FIG. 3 is a block diagram of an apparatus 300 that identifies where RF signal strength sampling within a broadcast area 310 would improve the accuracy of estimates of locations in an exemplary embodiment. In this embodiment, apparatus 300 includes a memory 302 that is communicatively coupled to electronic circuitry 304. Memory 302 stores RSS values 306 that are mapped to known locations within broadcast area 310. RSS values 306 may comprise RSS Indicator values (RSSI) in some embodiments. Referring to FIG. 3, RSS value 1 is mapped to a known location L1, while RSS value 2 is mapped to a known location L2. Although the singular term "RSS value" is used herein, the use of a plurality of wireless transmitters 302 within broadcast areas 300 may result in multiple RSS values being mapped to a particular known location. For instance, RSS1 illustrated in FIG. 3 may correspond to three separate RSS values; one for each of the wireless transmitters 312. Although only three wireless transmitters 312 are illustrated in FIG. 3, broadcast area 300 may be served by any number of wireless transmitters 312 as desired. Generating RSS values 306 may be performed using an RF site survey of broadcast area 310, where an RF receiver measures the RSS value at different known locations within broadcast area 310. The measured RSS values are then mapped or correlated with the locations within broadcast area 310 where the measurements were taken.

In this embodiment, memory 302 also stores RSS values 308 that are not mapped to known locations within broadcast area 310. RSS values 308 may comprise RSSI values in some embodiments. Generating RSS values 306 may be performed using an RF site survey of broadcast area 310, where an RF receiver measures the RSS values at different locations within broadcast area 310. However, unlike RSS values 306, which are mapped to known locations, the location information for RSS values 308 is not recorded along with the RF information.

While the specific hardware implementation of apparatus 300 is subject to design choices, one particular embodiment may include one or more memory elements 302 coupled with electronic circuitry 304. Memory 302 includes any electronic circuits, and/or optical circuits, and/or magnetic circuits that are able to store data. Memory 302 may include one or more volatile or non-volatile Dynamic Random Access Memory (DRAM) devices, FLASH devices, volatile or non-volatile Static RAM devices, magnetic disk drives, Solid State Disks (SSDs), or any combination thereof. Some examples of non-volatile DRAM and SRAM include battery-backed DRAM and battery-backed SRAM.

Electronic circuitry 304 includes any electronic circuits and/or optical circuits that are able to perform functions. For example, electronic circuitry 304 may perform the functions described herein for apparatus 300. Electronic circuitry 304 may include one or more Central Processing Units (CPU), microprocessors, Digital Signal Processors (DSPs), Application-specific Integrated Circuits (ASICs), Programmable Logic Devices (PLD), control circuitry, or any combination thereof. Some examples of processors include INTEL® CORE™ processors, Advanced Reduced Instruction Set Computing (RISC) Machines (ARM®) processors, etc. When electronic circuitry 304 includes programmable devices, electronic circuitry 304 may execute pre-programmed instructions that enable electronic circuitry 304 to perform the functions described herein with respect to apparatus 300.

Figure 4:
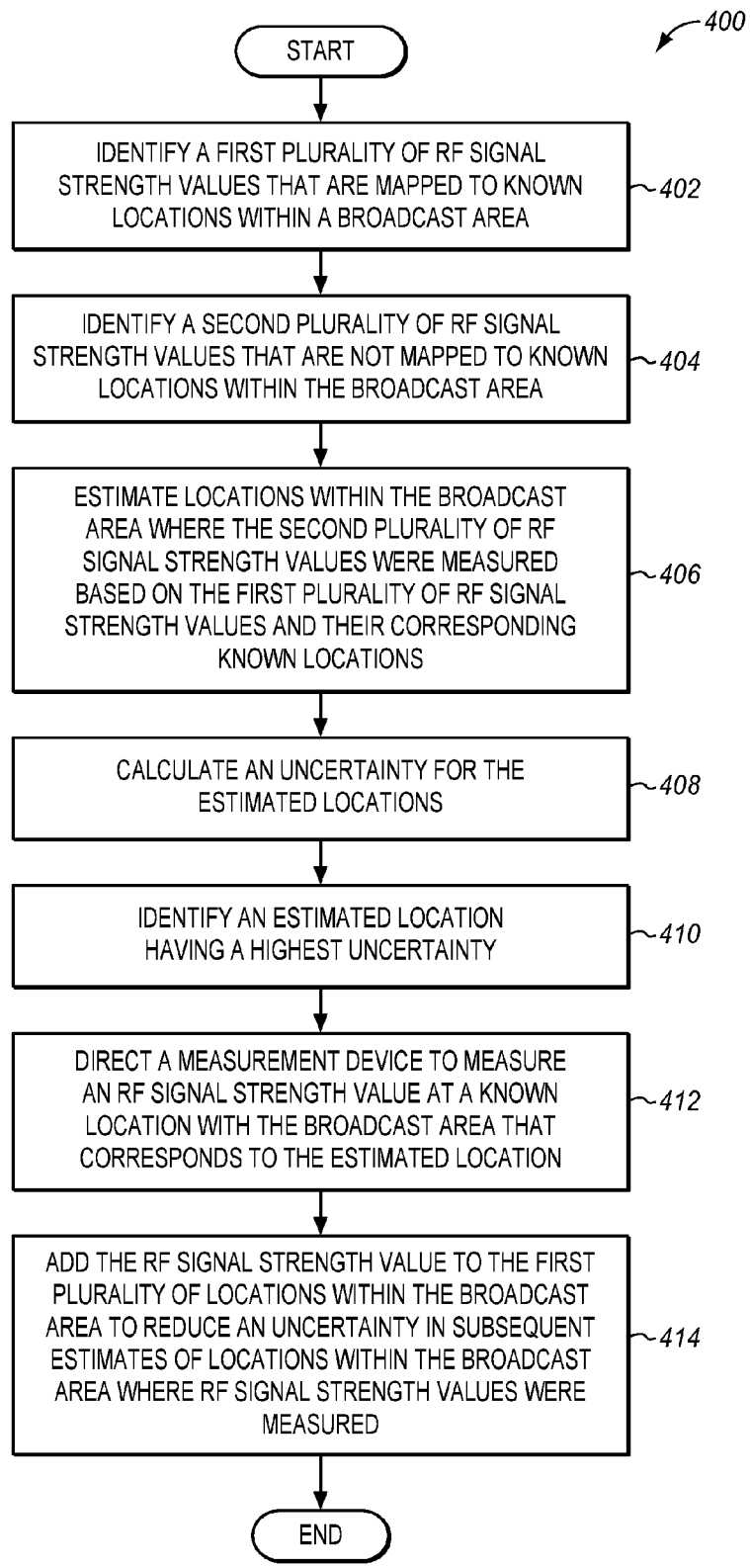
FIG. 4 is a flow chart of a method performed in a broadcast area served by a plurality of RF transmitters in an exemplary embodiment.

FIG. 4 is a flow chart of a method 400 performed in a broadcast area served by a plurality of RF transmitters in an exemplary embodiment. Method 400 will be discussed with respect to apparatus 300 of FIG. 3, although method 400 may be performed by other systems not shown. The steps of method 400 are not all inclusive and may include other steps that are not shown. Also, the steps may be performed in an alternate order.

In order for electronic circuitry 304 of apparatus 300 to begin a process that identifies where RF signal strength sampling within broadcast area 310 would improve the accuracy of estimates of locations, electronic circuitry 304 identifies RF RSS values 306 that are mapped to known locations within broadcast area 310 (see step 402). RSS values 306 may be generated during an RF site survey of broadcast area 310. To perform a site survey, an operator may carry an RF receiver around to different physical locations within broadcast area 310, and log both the RSS values and the location information that allows the RSS values to be mapped to the known locations.

Electronic circuitry 304 identifies RF RSS values 308, which are not mapped to known locations within broadcast area 310 (see step 404). RSS values 308 may be generated by carrying an RF receiver around and logging different RSS values within broadcast area 310. In this case, the location of the samples is not recorded. These samples will be used as the test data for estimating locations of the samples within broadcast area 310.

Electronic circuitry 304 estimates locations within broadcast area 310 where RSS values 308 were measured based on RSS values 306 and their corresponding known locations within broadcast area 310 (see step 406). For instance, electronic circuitry 304 may perform interpolation or regression for each of the RSS samples that make up RSS values 308 against the RSS values and their known locations to estimate a location within broadcast area 310 where each of the samples were measured.

Figure 5:
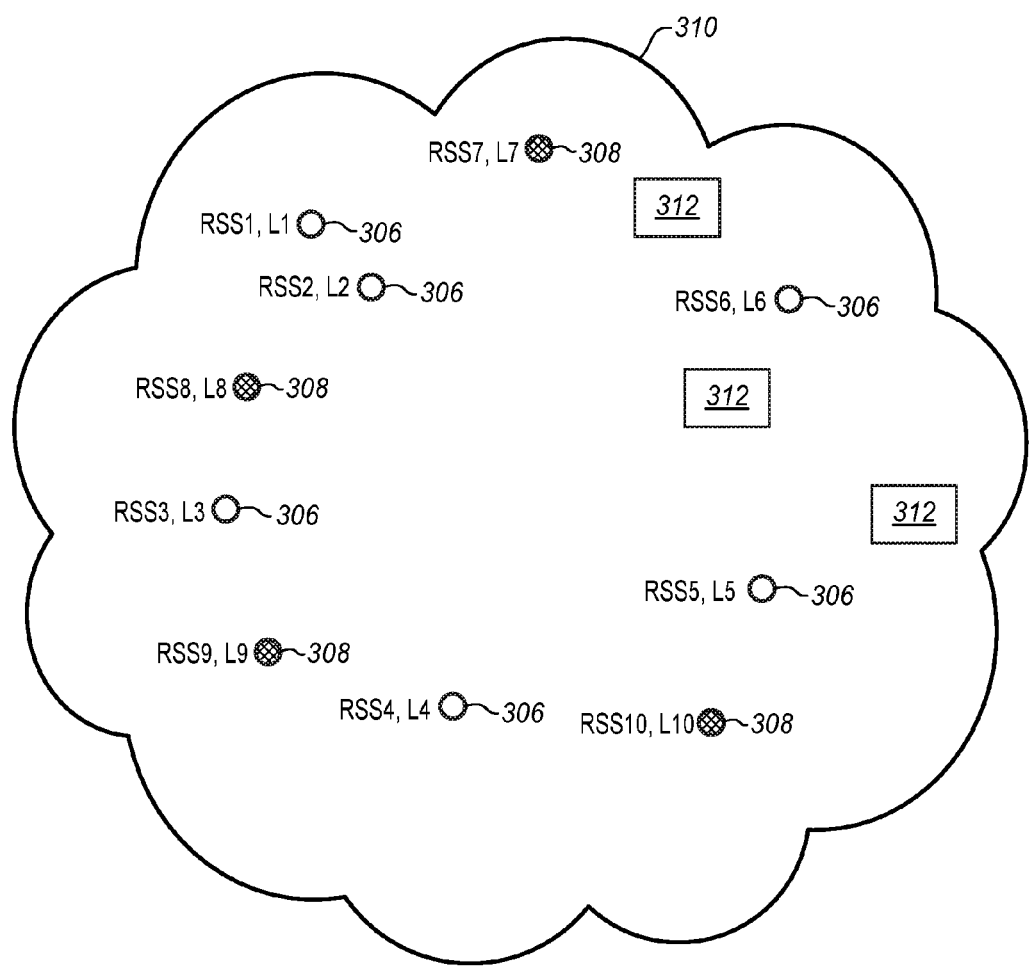
FIG. 5 illustrates broadcast area includes the estimates of locations for RSS values 308 in an exemplary embodiment.

FIG. 5 illustrates broadcast area 310 includes the estimates of locations for RSS values 308 in an exemplary embodiment. Since the estimated locations where RSS values 308 were measured are not perfect, some uncertainty is expected in the estimates. Therefore, although FIG. 5 illustrates the estimated locations in a specific area within broadcast area 310, some measure of uncertainty exists in the specific location. Electronic circuitry 304 performs a calculation to estimate the uncertainty for the estimated locations for RSS values 308 (see step 408). For instance, electronic circuitry 304 may calculate the uncertainty based on how known locations that are proximate to the estimated locations are distributed.

Electronic circuitry 304 identifies the estimated location having a highest uncertainty (see step 410). To do so, electronic circuitry 304 may rank or otherwise sort the uncertainties associated with each of the estimated locations for RSS values 308, and identify which of the estimated locations has the highest uncertainty. For example, electronic circuitry 304 may identify RSS10, L10 as having the highest uncertainty out of RSS values 308.

Electronic circuitry 304 directs a measurement device to measure an RSS value at a known location within broadcast area 310 that corresponds with the estimated location having the highest uncertainty (see step 412). For example, electronic circuitry 304 may direct an operator with an RF receiver to travel to location L10 within broadcast area 310, and take a RSS measurement.

Electronic circuitry 304 adds the measured RSS value to RSS values 306 stored in memory 302 (see step 414). In this case, the measured RSS value is now mapped to a known location within broadcast area 310, as is the other RSS values 306 stored in memory 302. During subsequent estimates of locations using RSS measurements, adding the measured RSS value will reduce the uncertainty associated with the estimates. In effect, adding this information to RSS values 306 helps to reduce the overall uncertainty for subsequent estimates of location by identifying or targeting regions of the RF location model formed by RSS values 306 that have more uncertainty than other regions. This type of directed measurement is not random, but is a target process that reduces the uncertainty in the RF model without requiring a large number of random RF samples within broadcast area 310. The additions to RSS values 306 may be performed repetitively, with steps 406-414 being performed multiple times to reduce the overall uncertainty for the RF location model created by RSS values 306.

Figure 6:
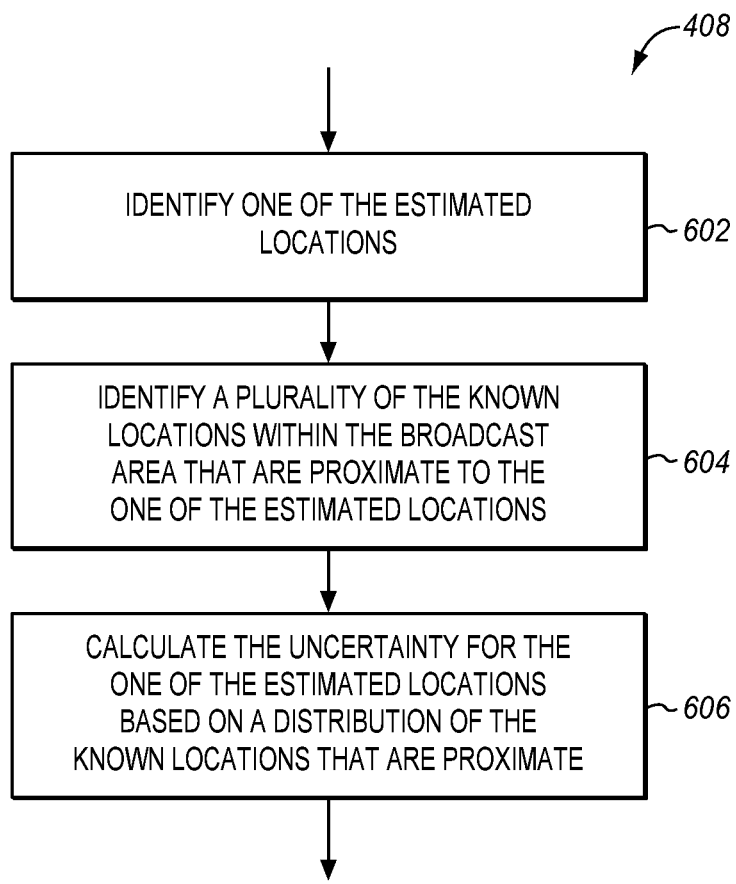
FIG. 6 is a flow chart illustrating additional details for a step of the method of FIG. 4 in an exemplary embodiment.
Figure 7:
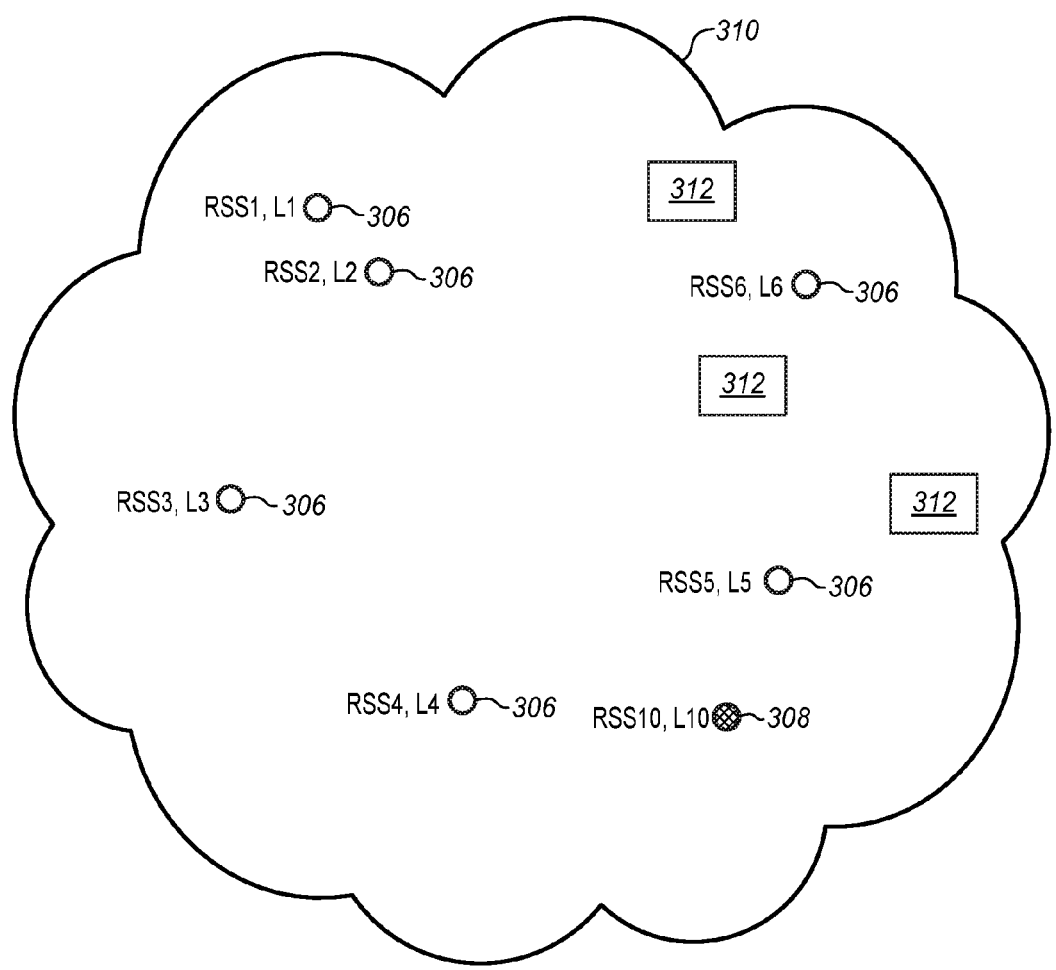
FIG. 7 illustrates one of the estimated locations within a broadcast area in an exemplary embodiment.

FIG. 6 is a flow chart illustrating additional details for a step of the method of FIG. 4 in an exemplary embodiment. In FIG. 6, additional details are illustrated for step 408 of method 400, for calculating the uncertainty for the estimated locations within broadcast area 310. Electronic circuitry 304 identifies one of the estimated locations previously calculated in step 406 (see step 602 of FIG. 6). FIG. 7 illustrates one of the estimated locations within broadcast area in an exemplary embodiment. In particular, RSS10, at L10 is selected for discussion. L10 is proximate to known location L5 and L4 in FIG. 7.

Electronic circuitry 304 identifies a plurality of the known locations within broadcast area 310 that are proximate to the estimated location (see step 604). In the example, L10 is proximate to L5 and L4, while L1, which is distant from L10, is not proximate to L10. Electronic circuitry 304 may, for instance, select the nearest two known locations proximate to L10.

Electronic circuitry 304 calculates an uncertainty for L10 based on the distribution of the known locations that are proximate (see step 606). For instance, electronic circuitry 304 may calculate the standard deviation for the distribution of L4 & L5, and/or the entropy of the distribution of L4 & L5. Although only discussed with respect to one estimated location, the standard deviation and/or entropy may be calculated for the estimated locations in turn, and an estimated location having the highest uncertainty identified. It is this identified location that is sampled and added to the set of RSS values 306, thereby reducing the uncertainty associated with an RF model that is based on RSS values 306. Generally, the standard deviation can be found as follows: Let $m_i$ be the mean location vector of all the k nearest neighbors of estimated location $Y_i$ that are denoted by $Y_1^i, \ldots, Y_k^i$. Then, the standard deviation vector $\vec{\sigma}$ is computed as:

$$\vec{\sigma} = \sqrt{\frac{1}{K}\sum_{j=1}^{k}(m_i - Y_j^i)^{\wedge}2}$$

The standard deviation itself is the sum of the coordinates of $\vec{\sigma}$:

$$\text{std} = \Sigma_l \vec{\sigma}_l.$$

As for the entropy H(Y_i): create a binned distribution of the values of the l-th coordinate among the neighbors $Y_1^i, \ldots, Y_k^i$ then measure the probability of having a value within the range of each bin. For example if the values are spread between −5 and +5 we bin (for example) every 2, so the bins would be [−5,−3], [−3,−1], [−1,+1], [1,3], [3,5]. If we have a total of k=100 neighbors and (for example) in bin [−3,−1] we have 20 values, compute the probability of a value in [−3,−1] to be 20/100=0.2. Let's denote the probability of bin q to be $P_q^l$. Then look at all the bins and compute the entropy for the l-th coordinate as:

$$H_l(Y\_i) = \sum_q P_q^l \ln P_q^l$$

Finally we compute the whole entropy to be $$\text{Ent}(Y\_i) = \sum_l H_l(Y\_i)$$

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as non-transitory instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

I claim:

1. An apparatus comprising:
    a memory configured to store a first plurality of Radio Frequency (RF) signal strength values that are mapped to known locations within a broadcast area served by a plurality of RF transmitters, and to store a second plurality of RF signal strength values that are not mapped to known locations within the broadcast area; and
    electronic circuitry communicatively coupled to the memory that is configured to estimate locations within the broadcast area where the second plurality of RF signal strength values were measured based on the first plurality of RF signal strength values and their corresponding known locations;
    the electronic circuitry configured to calculate an uncertainty for the estimated locations, and to identify an estimated location having a highest uncertainty;
    the electronic circuitry configured to direct a measurement device to measure an RF signal strength value at a known location within the broadcast area that corresponds with the estimated location, and to add the RF signal strength value to the first plurality of RF signal strength values to reduce an uncertainty in subsequent estimates of locations within the broadcast area where RF signal strength values were measured.

2. The apparatus of claim 1 wherein the electronic circuitry is configured to iteratively perform the following to further reduce the uncertainty in subsequent estimates of locations within the broadcast area where RF signal strength values were measured:
    re-estimate the locations based on additions to the first plurality of RF signal strength values and their corresponding known locations, calculate an uncertainty for the re-estimated locations, identify a re-estimated location having the highest uncertainty, direct the measurement device to measure another RF signal strength value at a known location within the broadcast area that corresponds with the re-estimated location, and add the other RF signal strength value to the first plurality of RF signal strength values.

3. The apparatus of claim 1 wherein the RF signal strength values comprise Receive Signal Strength Indicator (RSSI) values.

4. The apparatus of claim 1 wherein:
    the electronic circuitry is configured to identify one of the estimated locations, to identify plurality of the known locations within the broadcast area that are proximate to the one of the estimated locations, and to calculate the uncertainty for the one of the estimated locations based on a distribution of the known locations that are proximate.

5. The apparatus of claim 4 wherein the electronic circuitry is configured to calculate the uncertainty based on a standard deviation of the distribution.

6. The apparatus of claim 4 wherein the electronic circuitry is configured to calculate the uncertainty based on an entropy of the distribution.

7. A method performed in a broadcast area served by a plurality of Radio Frequency (RF) transmitters, the method comprising:
    identifying a first plurality of RF signal strength values that are mapped to known locations within the broadcast area;
    identifying a second plurality of RF signal strength values that are not mapped to known locations within the broadcast area;
    estimating locations within the broadcast area where the second plurality of RF signal strength values were measured based on the first plurality of RF signal strength values and their corresponding known locations;
    calculating an uncertainty for the estimated locations;
    identifying an estimated location having a highest uncertainty;
    directing a measurement device to measure an RF signal strength value at a known location within the broadcast area that corresponds with the estimated location; and
    adding the RF signal strength value to the first plurality of RF signal strength values to reduce an uncertainty in subsequent estimates of locations within the broadcast area where RF signal strength values were measured.

8. The method of claim 7 further comprising iteratively performing the steps of:
    re-estimating the locations based on additions to the first plurality of RF signal strength values and their corresponding known locations;
    calculating an uncertainty for the re-estimated locations;
    identifying a re-estimated location having the highest uncertainty;
    directing the measurement device to measure another RF signal strength value at a known location within the broadcast area that corresponds with the re-estimated location; and
    adding the other RF signal strength value to the first plurality of RF signal strength values to further reduce the uncertainty in subsequent estimates of locations within the broadcast area where RF signal strength values were measured.

9. The method of claim 7 wherein the RF signal strength values comprise Receive Signal Strength Indicator (RSSI) values.

10. The method of claim 7 wherein calculating the uncertainty for the estimated locations comprises:
   identifying one of the estimated locations;
   identifying a plurality of the known locations within the broadcast area that are proximate to the one of the estimated locations; and
   calculating the uncertainty for the one of the estimated locations based on a distribution of the known locations that are proximate.

11. The method of claim 10 wherein the uncertainty is calculated based on a standard deviation of the distribution.

12. The method of claim 10 wherein the uncertainty is calculated based on an entropy of the distribution.

13. A non-transitory computer readable medium embodying programmed instructions which, when executed by a processor, direct the processor to:
   identify a first plurality of Radio Frequency (RF) signal strength values that are mapped to known locations within a broadcast area served by a plurality of RF transmitters;
   identify a second plurality of RF signal strength values that are not mapped to known locations within the broadcast area;
   estimate locations within the broadcast area where the second plurality of RF signal strength values were measured based on the first plurality of RF signal strength values and their corresponding known locations;
   calculate an uncertainty for the estimated locations;
   identify an estimated location having a highest uncertainty;
   direct a measurement device to measure of an RF signal strength value at a known location within the broadcast area that corresponds with the estimated location; and
   add the RF signal strength value to the first plurality of RF signal strength values to reduce an uncertainty in subsequent estimates of locations within the broadcast area where RF signal strength values were measured.

14. The non-transitory computer readable medium of claim 13 further comprising instructions that direct the processor to iteratively performing the steps of:
   re-estimate the locations based on additions to the first plurality of RF signal strength values and their corresponding known locations;
   calculate an uncertainty for the re-estimated locations;
   identify a re-estimated location having the highest uncertainty;
   direct the measurement device to measure another RF signal strength value at a known location within the broadcast area that corresponds with the re-estimated location; and
   add the other RF signal strength value to the first plurality of RF signal strength values to further reduce the uncertainty in subsequent estimates of locations within the broadcast area where RF signal strength values were measured.

15. The non-transitory computer readable medium of claim 13 wherein the RF signal strength values comprise Receive Signal Strength Indicator (RSSI) values.

16. The non-transitory computer readable medium of claim 13 wherein the instructions that direct the processor to calculate the uncertainty for the estimated locations comprise instructions that direct the processor to:
   identify one of the estimated locations;
   identify a plurality of the known locations within the broadcast area that are proximate to the one of the estimated locations; and
   calculate the uncertainty for the one of the estimated locations based on a distribution of the known locations that are proximate.

17. The non-transitory computer readable medium of claim 16 wherein the instructions direct the processor to calculate the uncertainty based on a standard deviation of the distribution.

18. The non-transitory computer readable medium of claim 16 wherein the instructions direct the processor to calculate the uncertainty based on an entropy of the distribution.

* * * * *